A. L. KOENIG.
SWITCH FOR STOP SIGNALS FOR AUTOMOBILES.
APPLICATION FILED DEC. 1, 1919.

1,383,821. Patented July 5, 1921.

Inventor:
Alfred L. Koenig
by Albert Scheible
Attorney

Witness:
R. L. Farrington

UNITED STATES PATENT OFFICE.

ALFRED L. KOENIG, OF CHICAGO, ILLINOIS.

SWITCH FOR STOP-SIGNALS FOR AUTOMOBILES.

1,383,821.  Specification of Letters Patent.  Patented July 5, 1921.

Application filed December 1, 1919. Serial No. 341,725.

*To all whom it may concern:*

Be it known that I, ALFRED L. KOENIG, citizen of the United States, residing at Chicago, Illinois, have invented certain new and useful Improvements in Switches for Stop-Signals for Automobiles; and I do hereby declare the following to be a full, clear, and exact description of the invention, such as will enable others skilled in the art to which it appertains to make and use the same.

My invention relates to means for enabling the driver of an automobile or other vehicle to signal to parties in the rear of his vehicle when he is about to stop, or at least is about to reduce the speed of the automobile. Heretofore, larger numbers of accidents have been due to rear end collisions between automobiles, owing to the fact that the average driver finds it difficult to observe the slacking of the vehicle in front of him in sufficient time to properly slacken or stop the automobile which he is driving.

To overcome this source of danger and of damage to both life and property, various attempts have been made with a view to equipping automobiles upon their rear with signs indicating the intention of stopping the automobile. Attention has usually been called to such signs by suddenly illuminating them, or otherwise altering their appearance through electrical mechanism operated by the driver of the automobile. However, this has commonly involved the providing of a suitable switch either on the steering wheel or on the dashboard of the automobile, which had to be manipulated for the purpose of actuating the signal. In practice, the necessity for a reduction in speed of a vehicle, or for an entire stopping of the same, often arises so suddenly that the driver does not have time to manipulate an added switch, or to consider any added moves beyond those of steering the vehicle and of altering its speed. Consequently, such rear end signals have not shown their expected results in the actual preventing of collisions.

To obviate this shortcoming, my invention aims to provide a simple switching mechanism which will not require any additional movements or attention of any kind on the part of the driver of the automobile, but which will be automatically responsive to the operation most commonly required for any unexpected slacking in speed of the auto, or for a stopping of the latter, namely the setting of the brake. More particularly, my invention aims to provide a switching mechanism for this purpose which will be actuated by some moving part of the mechanism for actuating the brake, and desirably to provide this so that it can readily be connected to the rod which forms a part of the operative connection between the foot lever and the brake. Furthermore, my invention aims to provide simple means for automatically returning the switch to its "off" position when the brake-actuating foot pressure is released; to provide simple means for adjusting the mechanism in operative position, and to provide simple means for preventing an overstraining of the switch parts in case the movement of the part of the brake mechanism to which the switch is connected exceeds that required for actuating the switch. Still further and more detailed objects will appear from the following specification and from the accompanying drawings, in which—

Figure 1:
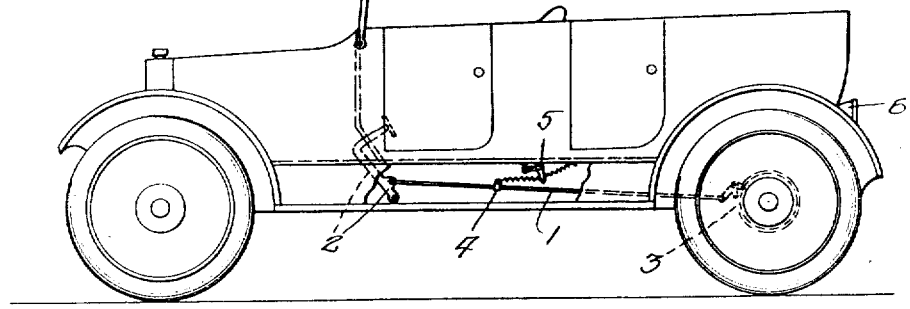
Figure 1 is a fragmentary longitudinal section through an automobile showing a signal-switching mechanism embodying my invention.
Figure 2:
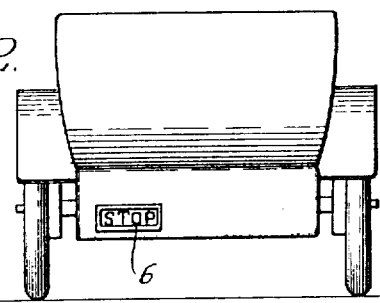
Fig. 2 is a fragmentary view of the rear of the same auto, showing the stop signal as displayed on the same.

In the embodiment of the drawings, Fig. 1 shows an automobile including a brake rod 1 connecting the foot lever 2 with the means for tightening the brake band 3 on one of the rear wheels of the vehicle. Mounted on the rod 1 is a clamp 4 which is operatively connected to a spring-retracted switch 5 as shown more in detail in Fig. 3. This switch controls the circuit leading from the lighting equipment of the automobile to a lamp mounted in a casing 6 at the rear of the vehicle, which casing has a face painted with the word "Stop" arranged so that it will be displayed when the lamp is lighted.

To control the lighting circuit for this purpose, I am here showing a switch including as one terminal a contact 7 mounted on an insulating base 8 which also carries the pivotal mounting for a rocking lever 9. Fastened to one arm of this rocking lever is an insulating block 10 carrying a resilient contact 11 which is adapted to engage the heretofore mentioned contact 7 when the lever 9 is sufficiently moved toward the left of the drawing in Fig. 3. Interposed between the clamp 4 and the lever 9 is a suitable connection whereby the movement of the rod 1 toward the left in Fig. 3 will rock the arm 9 on its pivotal mounting, so as to swing the contact 11 against the contact 7, thereby closing the circuit to the lamp which lights the rear signal. The rocking lever 9 also has associated with it suitable means for returning the same to its normal position, in which position it holds the switch open. For example, I may provide a relatively light spring 13 connecting this rocking lever with a lug 14 secured to the floor 15 of the vehicle. To prevent an overstraining of the switch parts by an excessive movement of the rod 1, such as might occur in case the clamp 4 were not secured at exactly the right point on the rod 1, or in case the changes due to expansion and contraction materially affect the distances between the connected parts, I also preferably employ yielding means for connecting the clamp 4 with the rocking lever 9. For example, I may employ a spiral spring 12 which spring will be distended in case the movement of the rod 1 toward the left of Fig. 3 is continued beyond the point where it brings the contacts 11 and 7 into effective engagement with each other.

Figure 3:
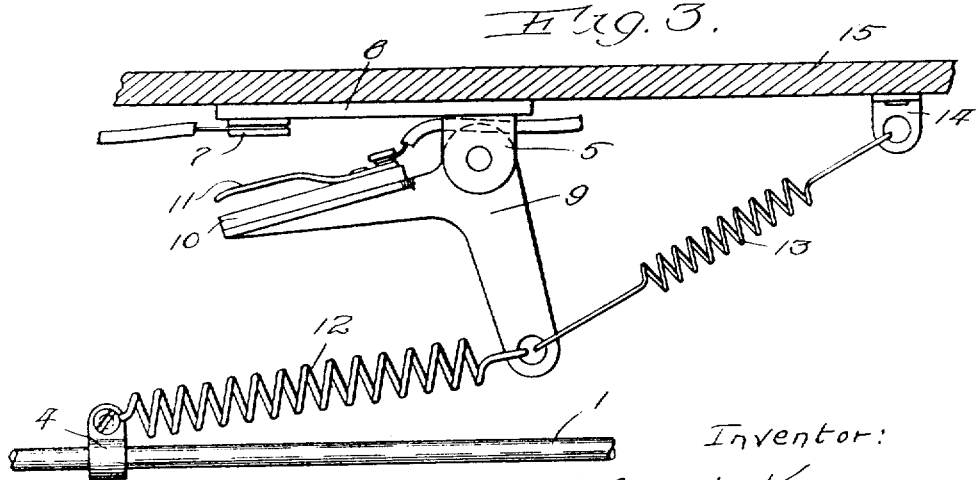
Fig. 3 is an enlarged elevation of the switching mechanism of Fig. 1.

With the mechanism thus arranged, it will be obvious from the drawings that when the foot lever is depressed for actuating the brake, the rod 1 will be moved forwardly of the vehicle or toward the left in Fig. 3, and that in doing so it will carry the clamp 4 forward with it. Consequently, the spring 12 (which is made much stronger than the retracting spring 13) will act as the connecting link for rocking the lever 9 in a clockwise direction until the contact 11 is pressed against the contacts 7 and the signal-lamp circuit is closed. Then further forward movement of the rod 1 will be taken up by an extension of the spring 12 without overstraining the switch parts, and the signal circuit will be kept closed as long as the brake is set. During the releasing of the brake, the rod 1 will be drawn backward, thereby releasing the tension on the spring connecting member 12 and permitting the spring 13 to return the rocking lever to its original position of Fig. 3, and consequently opening the signal lamp circuit.

Since the switching is entirely automatic and in direct response to the movement of the brake lever, the lighting of the rear stop-signal will be entirely automatic and in immediate response to the setting of the brake, and the signal will therefore be displayed as soon as the brake is actuated, without requiring any added thought or manipulation on the part of the driver of the vehicle. Likewise, the opening of the switch and the consequent discontinuing of this rear signal will be entirely automatic in response to the releasing of the brake, and also will require no thought or attention on the part of the operator. My simple mechanism will therefore provide positive means for giving the desired notice to vehicles in the rear of the automobile which is equipped with my invention, and for attending to this notification automatically and only for the period during which such a signal is needed.

However, while I have illustrated and described my invention in an embodiment in which the operative connection is made to one particular part of the braking mechanism, namely the rod extending substantially horizontally under the floor of the vehicle, and have illustrated the switch itself in a particular form, I do not wish to be limited to these or other details of the construction and arrangement here disclosed. Nor do I wish to be limited to the use of the particular form of visible signal here described. Obviously, the general construction and arrangement might be modified in many ways without departing from the spirit of the appended claims.

I claim as my invention:

1. In a vehicle signal, a base adapted to be secured to the vehicle adjacent to the braking rod thereof, a contact on one end of the base, a bell crank lever pivoted to and depending from the opposite end of the base, a contact insulated from and carried by the bell crank and engageable with the base contact, a light spring connected to one end of the lever and to the car for normally holding the lever inoperative, and a heavier spring connected to said end of the lever and to the braking rod for moving the lever to operative position upon actuation of the braking rod and for allowing movement of said rod after the lever has reached its limit of movement.

2. In a vehicle signal and operating device for actuation by the braking device of the vehicle, means to render the signal operative including a pivoted lever formed for attachment to and for depending from the car bottom, a spring connected to one side of the lever adjacent the lower end thereof and adapted to be connected to the brake rod whereby to permit of movement of the brake rod after the lever has reached its limit of movement, and a spring connected to the opposite side of the lever and adapted to be attached to the car bottom for restoring the lever to normal position upon release of the brake rod.

3. In a vehicle signal, a longitudinally movable actuating rod, a bell crank lever adapted for securement to the vehicle with one arm extending toward the rod and terminating in an eye, a spring connecting the eye to the rod, a lighter spring connected at one end to the eye and extending oppositely therefrom to a fixed point, an insulating block fixed on the other arm of the bell crank lever, and spaced contacts one of which is resiliently carried by the block.

Signed at Chicago, November 25th, 1919.

ALFRED L. KOENIG.